(12) United States Patent
Wang et al.

(10) Patent No.: US 11,768,306 B2
(45) Date of Patent: Sep. 26, 2023

(54) ENHANCED ANISOTROPY ANALYSIS WITH MULTICOMPONENT DIPOLE SONIC DATA

(71) Applicant: Halliburton Energy Services, Inc., Houston, TX (US)

(72) Inventors: Ruijia Wang, Singapore (SI); Baichun Sun, Pert (AU)

(73) Assignee: Halliburton Energy Services, Inc., Houston, TX (US)

(*) Notice: Subject to any disclaimer, the term of this patent is extended or adjusted under 35 U.S.C. 154(b) by 513 days.

(21) Appl. No.: 16/606,683

(22) PCT Filed: Nov. 21, 2018

(86) PCT No.: PCT/US2018/062230
§ 371 (c)(1),
(2) Date: Oct. 18, 2019

(87) PCT Pub. No.: WO2020/106287
PCT Pub. Date: May 28, 2020

(65) Prior Publication Data
US 2021/0048546 A1    Feb. 18, 2021

(51) Int. Cl.
*G01V 1/50* (2006.01)
*G01V 1/28* (2006.01)

(52) U.S. Cl.
CPC ............... *G01V 1/50* (2013.01); *G01V 1/284* (2013.01); *G01V 2210/626* (2013.01); *G01V 2210/6222* (2013.01)

(58) Field of Classification Search
CPC .. G01V 1/50; G01V 1/284; G01V 2210/6222; G01V 2210/626
See application file for complete search history.

(56) References Cited

U.S. PATENT DOCUMENTS

| | | |
|---|---|---|
| 5,214,613 A | 5/1993 | Esmersoy |
| 5,712,829 A | 1/1998 | Tang et al. |
| 5,808,963 A | 9/1998 | Esmersoy |

(Continued)

FOREIGN PATENT DOCUMENTS

| | | | |
|---|---|---|---|
| CN | 102830433 A | * | 12/2012 |
| JP | 2007085940 A | * | 4/2007 |

(Continued)

OTHER PUBLICATIONS

J. Walsh and et al., "A Dispersion-Based Method for Measuring Dipole Shear Anisotropy", SPWLA 51st Annual Logging Symposium, Jun. 19-23, 2010 (Year: 2010).*

(Continued)

*Primary Examiner* — Douglas Kay
(74) *Attorney, Agent, or Firm* — John Wustenberg; C. Tumey Law Group PLLC

(57) ABSTRACT

A method may comprise: disposing an acoustic logging tool in a wellbore, wherein the acoustic logging tool comprises a transmitter and a receiver; emitting a flexural wave from the transmitter; recording a four component dipole waveform with the receiver, wherein the four component dipole waveform comprises XX, XY, YX, and YY components; rotating the four component dipole waveform using Alford rotation to produce rotated waveform components, wherein the rotated waveform components comprise $XX_\Theta$, $XY_\Theta$, $YX_\Theta$, and $YY_\Theta$ components; comparing a travel time of $XX_\Theta$ and $YY_\Theta$ components to identify a fast wave and a slow wave from the rotated waveform components; processing the fast wave and the slow wave using high-resolution data-driven processing to obtain a fast wave flexural dispersion curve and a slow wave flexural dispersion curve; determining a frequency dependent anisotropy curve using the fast wave flexural dispersion curve and the slow wave flexural dispersion curve; and determining a low-resolution shear anisotropy.

23 Claims, 9 Drawing Sheets

(56) References Cited

U.S. PATENT DOCUMENTS

| | | | |
|---|---|---|---|
| 6,718,266 B1 | 4/2004 | Sinha et al. | |
| 6,791,899 B2 | 9/2004 | Blanch et al. | |
| 7,310,285 B2 | 12/2007 | Donald et al. | |
| 2005/0090986 A1* | 4/2005 | Van Riel | G01V 1/30 702/6 |
| 2005/0122116 A1* | 6/2005 | Yu | G01V 3/28 324/339 |
| 2008/0157773 A1* | 7/2008 | Yu | G01V 3/28 324/339 |
| 2010/0309748 A1 | 12/2010 | Tang et al. | |
| 2011/0019501 A1 | 1/2011 | Market | |
| 2011/0280102 A1 | 11/2011 | Wang et al. | |
| 2012/0026831 A1 | 2/2012 | Mickael | |
| 2015/0112596 A1 | 4/2015 | Collins | |
| 2019/0025452 A1 | 1/2019 | Wang et al. | |
| 2019/0187316 A1* | 6/2019 | Mathiszik | E21B 47/095 |

FOREIGN PATENT DOCUMENTS

| | | | |
|---|---|---|---|
| WO | 20130134032 | 11/2013 | |
| WO | WO-2017172810 A1 * | 10/2017 | E21B 49/00 |

OTHER PUBLICATIONS

A. Manescu and et al., "An Anisotropy Study: Integrated Interpretation of Shear Wave and Resistivity Anisotropy in an Offshore Field in India", SPE Oil and Gas India Conference and Exhibition held in Mumbai, India, Jan. 20-22, 2010 (Year: 2010).*

D. Van Manen and et al., "Shear-wave Statics Using Receiver Functions", 2002 SEG Annual Meeting, Salt Lake City, Utah, Oct. 2002 (Year: 2002).*

E. Lympartos and E. Dermatas, "Acoustic Emission Source Location Using MultiFrequency Arrival Times", IEEE Melecon 2006, May 16-19, Benalmádena 'Málaga', Spain (Year: 2006).*

D. Yuan and A. Li, "Determination of Microseismic Event Back-Azimuth From S-Wave Splitting Analysis", SEG International Exposition and 86th Annual Meeting, 2016 (Year: 2006).*

S. Horne and et al., "Anisotropic Slowness Inversion Using 3D VSP Data", 2008 SEG Annual Meeting, Las Vegas, Nevada, Nov. 2008 (Year: 2008).*

M. Kozak and et al., "Azimuthal Shear Wave Anisotropy Analysis, Guided in time domain", SPWLA 55th Annual Logging Symposium, May 18-22, 2014 (Year: 2014).*

J.O. Parra and et al., "Dispersion Analysis and Inversion of Azimuthal Shear Anisotropy from Cross-Dipole Data", SPWLA 50th Annual Logging Symposium, Jun. 21-24, 2009 (Year: 2009).*

Methodology for Analytic Estimation of Fast Shear Polarization Direction in HTI Formations, Collins 2012.

International Search Report and Written Opinion for PCT/US2018/062230 dated Aug. 13, 2019.

* cited by examiner

ENHANCED ANISOTROPY ANALYSIS WITH MULTICOMPONENT DIPOLE SONIC DATA

BACKGROUND

Borehole acoustic logging tools are employed for a variety of purposes related to formation measurement and characterization. In general, acoustic logging tools measure different dispersive borehole wave modes propagating along the longitudinal borehole axis, and analyze the dispersions of target wave modes in order to determine various geophysical and mechanical properties of the formation through which the particular borehole passes. More particularly, dispersions characterize the relationship between wave slowness and wave number/frequency, and can be used to provide insight into various material and geometric properties of the borehole and surrounding formation, such as profiles of rock formation shear slowness and shear slowness anisotropy around the borehole. In some cases, a particular type of wave may be of interest—for example, the aforementioned profiling of rock formation shear anisotropy is based on an analysis of flexural waves.

Most borehole wave modes, such as flexural waves and screw waves, share similar characteristics in that their low-frequency asymptotes approach the shear slowness of the surrounding formation. For example, the flexural wave slowness approaches the shear wave slowness at low frequencies. Additionally, for anisotropy formations, the flexural wave slowness approaches the shear wave slowness polarized to the same direction of the flexural waves, so the flexural waves polarized to different direction have different wave slowness, whereupon the flexural slowness difference is utilized to extract formation shear anisotropy.

It is often very difficult to extract accurate formation shear anisotropy from raw borehole flexural waveform data due to the strong dispersion effects. Most borehole wave modes, such as flexural waves, are dispersive. For example, the flexural wave slowness approaches the shear wave slowness at low frequencies, and approaches the Scholte wave slowness at high frequencies. The excitation amplitude of the flexural modes at their low-frequency asymptotes is close to zero, and it reaches their maximum at Airy-phase frequency. Conventional processing using energetic-part of the flexural waves might not reach the low-frequency asymptotes, and thus yield biased anisotropy answer.

From another aspect of view, for strongly anisotropic formations, if the anisotropy is not well established, the interferences between fast flexural waves and slow flexural waves might bias the slowness estimates with conventional processing if the transmitter is oblique to the principle wave plane. Additionally, it is often the case in field data, the transmitter is oblique to fast/slow shear wave plane and thus processing such dipole data without accounting for such anisotropy effects may provide biased shear slowness and flexural dispersion estimates.

BRIEF DESCRIPTION OF THE DRAWINGS

These drawings illustrate certain aspects of some examples of the present disclosure, and should not be used to limit or define the disclosure.

DETAILED DESCRIPTION

Figure 1:
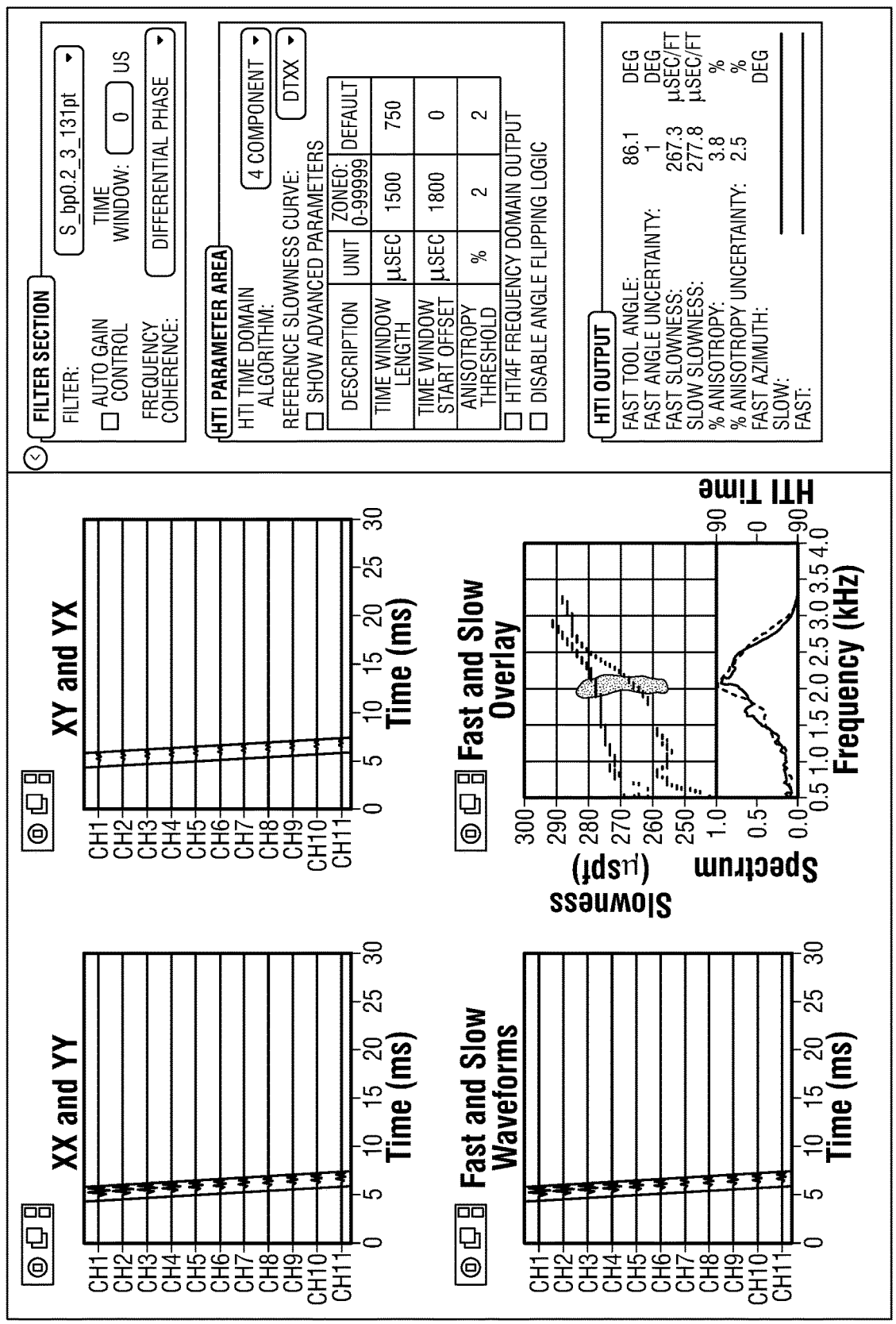
FIG. 1 illustrates a general example of horizontal transverse isotropy processing software.

This disclosure may generally relate to methods for acoustic logging and imaging a wellbore. In general, acoustic sensing may comprise inserting into a wellbore a tool with acoustic transmitter-receivers and inducing an acoustic wave to travel into the wellbore walls. Acoustic sensing may provide continuous in situ measurements of parameters related to formation or borehole fluid. Additionally, acoustic sensing may provide information about radial profiling, altered zone detection, and information about formation anisotropy, among others. The acoustic logging tools may operate on a conveyance. Acoustic logging tool may include an independent power supply and may store the acquired data on memory.

As disclosed herein, acoustic logging tools may be used to emit an acoustic signal that travels into the formation to provide data about anisotropic characteristics of the formation. Subterranean formations may exhibit a degree of elastic anisotropy such as intrinsic formation anisotropy, stress concentration induced anisotropy, or fracture induced anisotropy. In anisotropic media, shear waves split into orthogonally polarized components which have different velocities. A faster and slower shear wave may travel along the anisotropic media which can then be detected by a detector. The difference in velocity of the faster and slower shear wave may give information about the degree of anisotropy of the formation. In a fluid-filled wellbore, shear body waves may be absent. The flexural waves produced by dipole sources have similar characteristics as shear body waves. Flexural waves split into fast flexural and slow flexural waves in an anisotropic formation and the perpendicular orientation of the fast and flow flexural waves is the same as the fast and slow shear waves. Therefore, it is equivalent to measure the split flexural waves for formation shear wave anisotropy.

Flexural waves emitted by a dipole-acoustic source provide directional measurements of shear wave slowness around a wellbore. Mutually perpendicular pairs, also known as cross pairs, of dipole transmitters and receivers may detect and measure dipole shear-wave splitting. When flexural effects are considered, the detected and measured quantity may be the dipole-flexural-wave splitting. Wellbore flexural waves may be excited by dipole sources. Such waves have a similar splitting mechanism in anisotropic formations when compared to body shear waves. As such, the corresponding shear-wave anisotropy may be obtained by measuring the flexural anisotropy.

The low-frequency asymptote of flexural-wave dispersion curve approaches to the true body shear wave slowness, and as so, usually the extracted flexural anisotropy result is considered as the final shear wave anisotropy. Conventional cross-dipole slowness processing is based on time-semblance approaches for fast and slow wave slowness either by performing flexural wave matching or by semblance processing in time-domain to obtain fast and slow slowness separately. The processing techniques may generate smooth and continuous slowness or anisotropy logs as the processing techniques use the energetic frequency band of the flexural waves. However, flexural waves are dispersive in the formation, especially at the energetic frequencies. The dispersion degree is affected by multiple factors in the formation which may lead to the anisotropy processing with the energetic part of flexural wave to provide a biased anisotropy estimate of shear wave slowness. Additionally, the extracted shear-wave slowness by time-semblance processing may also be affected by flexural dispersion effects leading to incarnate results.

Sometimes the influences from dispersion effects may be larger than the anisotropy itself which may result in incorrect interpretation of a target zone or formation of interest. As so, dispersion correction is essential for accurately anisotropy analysis. An exact modeling-based algorithm may be used to perform a dispersion correction on the final slowness log but such corrections may be limited since the modeling-based algorithm may use isotropic models for correction. Additionally, it may be difficult to perform such an exact model-based dispersion correction for anisotropy formations because the high-frequency flexural anisotropy is influenced by a plurality of factors, and these factors are be easily accounted for with an isotropic and homogeneous formation model. Moreover, high-frequency flexural waves include important information on anisotropy type and therefore should not be simply discarded.

As previously described, flexural waves are dispersive. Their low-frequency slowness approaches the equivalent the true body shear wave slowness. However, excitation energies of flexural waves at very low-frequency bands may not exist and/or may suffer from low signal-to-noise ratio. Conventional anisotropy analysis uses high energy band of flexural waves for anisotropy processing due to the limited bandwidth of transmitters employed. However, estimated slowness and anisotropy curves may be biased due to the dispersive effects previously discussed. For example, the estimated shear slowness may be larger than the true shear. Additionally, flexural wave anisotropy varies with frequencies. In some cases of stress-induced anisotropy, a log may show crossed fast and slow flexural dispersion where the flexural anisotropy result at low and high frequency may have different signs. In such a case, the energetic part of flexural waves provides inadequate analysis for true shear wave anisotropy.

An elliptical borehole may cause splitting of flexural waves at certain frequencies even in isotropic formations. Flexural wave splitting due to irregular borehole shape may happen at relatively high frequencies or relatively high energy part of flexural waves. A time-semblance processing of data at these frequencies might not yield correct anisotropy results for body shear wave anisotropy. Even in the case of a round borehole without stress concentration, processing with high energy parts of flexural waves may yield biased shear anisotropy and slowness estimates. This may be due to the fast and slow flexural waves are affected by all moduli, including all the shear moduli, at slight high frequencies, instead of being uniquely controlled by their corresponding module at low-frequency asymptotes. This would suggest that it may be difficult to compute a true slowness and anisotropy from peak-frequency results by an isotropy-model-based dispersion correction method. A potential method to decrease dispersion-effects may be to apply a low pass filter on time-domain waveform data. However, low-pass filter processing may suffer from low signal-to-noise-ratio as the excitation of multiple flexural waves may become very low at the low-frequency asymptote. Also, since the high-frequency data is discarded by the low-frequency filter, the collected data are not fully utilized. As such, anisotropy analysis in the time domain may be difficult to calculate and account for flexural waves' dispersion effect.

FIG. 1 illustrates an exemplary time-domain horizontal transverse isotropy (HTI) processing with a band-pass filter of 0.2-3 kHz to remove leaky-P waves. The estimated DTFS (Delta-Time, fast shear) and DTSS (Delta-Time, slow shear) are 267.3 μs/ft. and 277.8 μs/ft. respectively which agree with peak-frequency slowness but is biased from low-frequency asymptotes as shown in the fast/slow dispersion display. The determined anisotropy is the anisotropy at peak frequencies, not the intrinsic formation anisotropy of body shear waves. The determined anisotropy does not account for complexity of flexural wave dispersion, and thus time domain processing is not able to capture the virgin formation anisotropy due to the wavelet including a multi-frequency component.

Figure 2A:
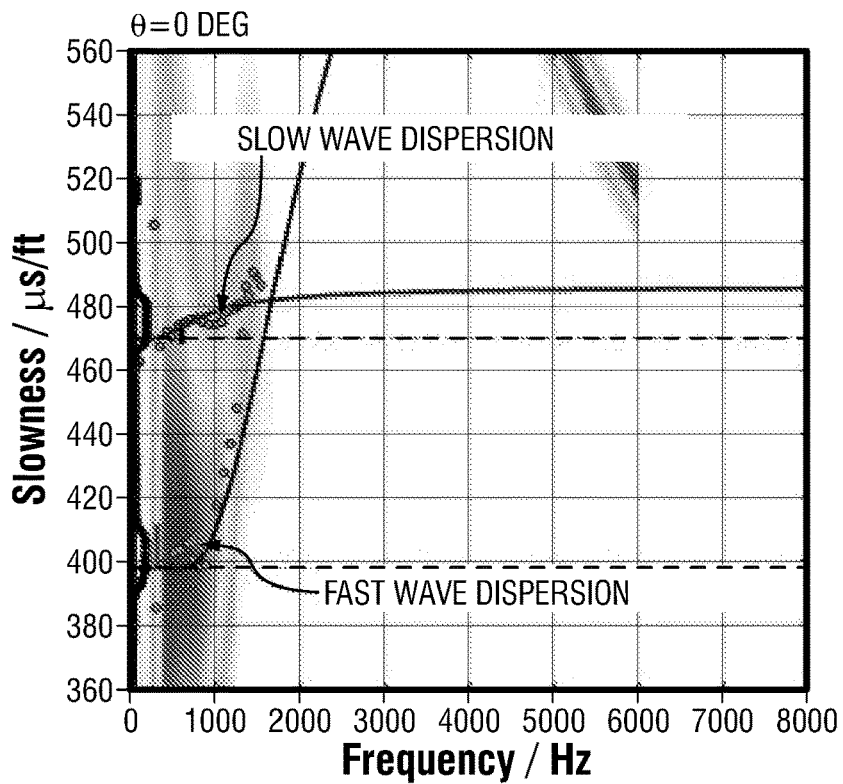
FIG. 2a illustrates dispersions of waveforms in dipole processing when formation is anisotropic, and the dipole is oriented to the fast and slow angle of the formation.
Figure 2B:
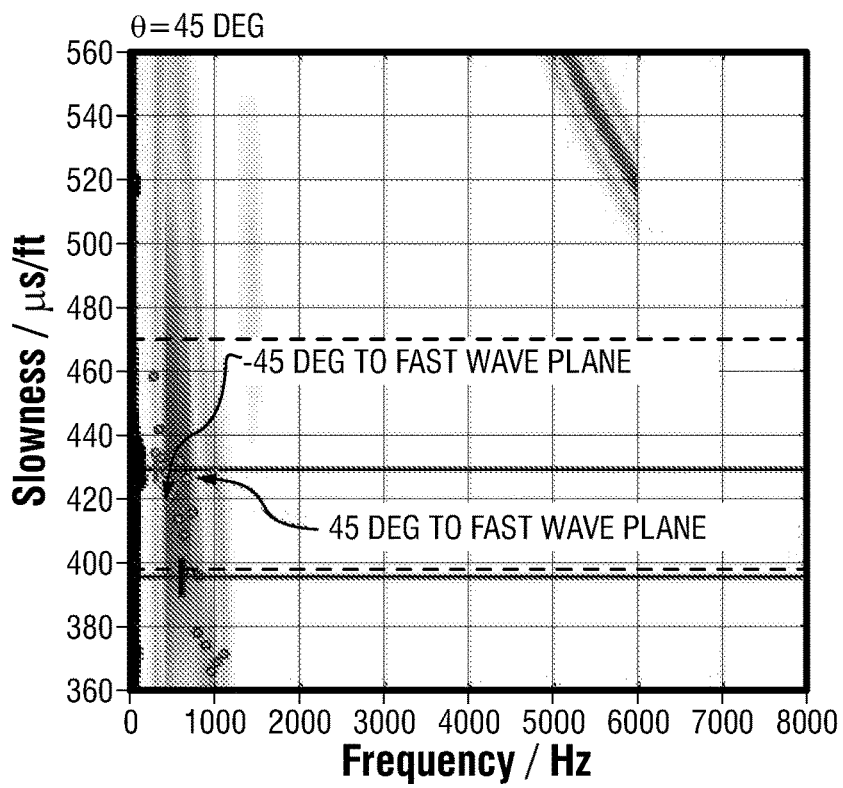
FIG. 2b illustrates dispersions of waveforms in dipole processing, when formation is anisotropic, and the dipole has 45 degree to the fast wave angle of the formation.

FIGS. 2a and 2b illustrate interference between fast and slow flexural dispersions in dipole processing. FIGS. 2a and 2b show the dispersions of XX and YY waveform when the transmitter is oriented to the fast wave plane, or there is a certain angle between the transmitter orientation and fast wave plane. The notation XX should be understood to mean X orientation transmitter and X orientation receiver. Similarly, the notation YY should be understood to mean Y orientation transmitter and Y orientation receiver. In FIG. 2a, X transmitter is oriented to fast wave plane, and Y transmitter is oriented to slow wave plane. For such a case, the XX wave component includes only fast waveform data, and YY component includes only slow waveform data. Processing XX and YY data yields pure fast wave dispersion and slow wave dispersion, respectively. Thus, there is no interference between fast and slow waves for such cases. However, as shown in FIG. 2b, when the transmitter orientation is oblique to the fast and the slow wave plane, XX component and YY component include mixed fast and slow waves, and processing XX and YY data provides biased dispersions. Because of the anisotropic effects, the extracted dispersion from the data set of θ=45 does not have a general feature of flexural dispersion, which is, as previously discussed, the flexural slowness value increases as frequency increases and converges to shear wave slowness at low frequencies and the flexural slowness converges to Scholte wave slowness at high frequencies. It suggests that interferences between fast waves and slow waves bias the slowness estimates when formation is strongly anisotropic and the transmitter is oblique to the principle wave plane. Additionally, it is often the case in field data, the transmitter is oblique to fast/slow shear wave plane and thus processing such dipole data without accounting for such anisotropy effects may provide biased shear slowness and flexural dispersion estimates.

For at least the foregoing reasons, one of ordinary skill in the art will appreciate that conventional processing may provide biased logs for anisotropy analysis. Additionally, the conventional processing does not provide an effective way to identify the type of anisotropy. The present disclosure may provide an approach for more accurate shear wave anisotropy analysis with reduced or eliminated dispersion-effects.

A method may comprise analyzing anisotropy using a model-constrained data-driven processing technique. Dispersion-effect-free fast and slow shear wave slowness may be provided as an output by the method. An anisotropy value at both the low-frequency limit and high-frequency limit may be provided as an indicator for formation anisotropy types. To provide reliable estimates for formations with a low degree of anisotropy, a low-axial-resolution anisotropy processing technique may be provided that matches fast and slow waves with a model-constrained anisotropy model. The low-axial-resolution results and the normal resolutions results can be used to confirm the processing results for each other.

Figure 3:
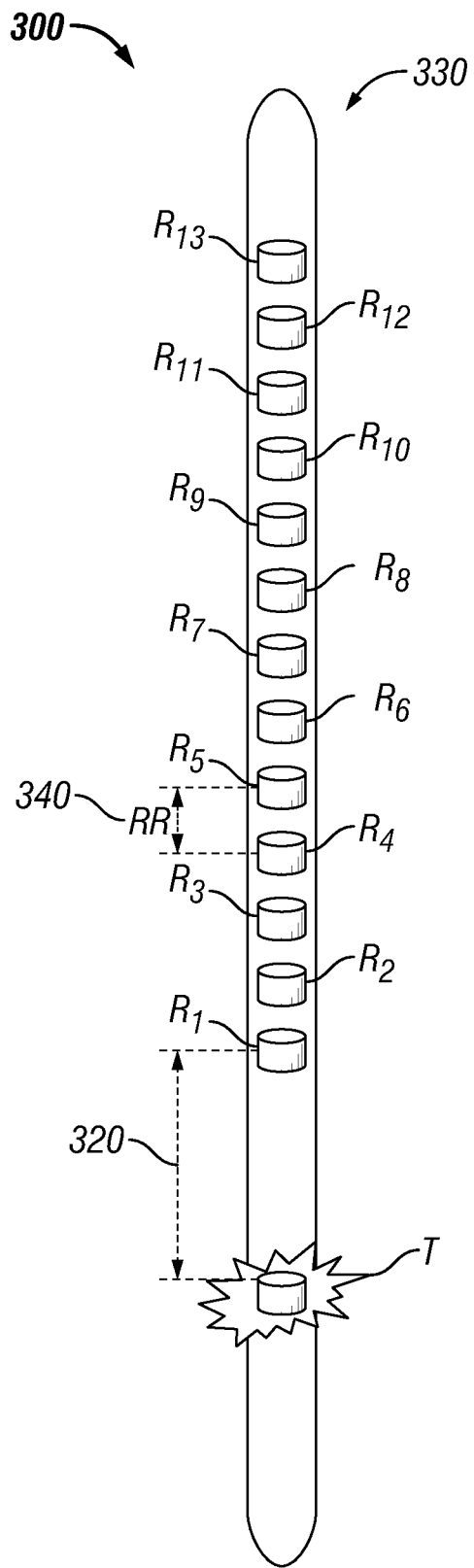
FIG. 3 illustrates a wellbore logging tool configured for cross-dipole sonic logging.

FIG. 3 illustrates a wellbore tool 300 that may be used in conjunction with the methods described herein. Wellbore tool 300 may be configured to transmit and capture a cross-dipole acoustic field. Wellbore tool 300 may comprise one or more transmitter stations T that are operable to transmit an acoustic signal both in X and Y directions. As illustrated, wellbore tool 300 comprises only one transmitter station, however, wellbore tool 300 may comprise a plurality of transmitter stations operable to transmit an acoustic signal in X and Y directions. Transmitter station T may comprise individual X direction transmitters and Y direction transmitters. The X direction transmitters and Y direction transmitters may not be in the same vertical position within wellbore tool 300. For example, an X direction transmitter and corresponding Y direction transmitter may be disposed at different vertical positions within wellbore tool 300. Wellbore tool 300 may further comprise a receiver array 330 comprising a number of receivers, illustrated here as thirteen receivers $R_1$-$R_{13}$. As illustrated, receivers $R_1$-$R_{13}$ are evenly spaced with a spacing 340. As illustrated, wellbore tool 300 comprises 13 receiver stations R but wellbore tool 300 may comprise any number of receiver stations R. As illustrated, transmitter T is separated from the first receiver $R_1$ by a transmitter-receiver separation 320. The large-span receiver array is capable of capturing an acoustic wave field of different azimuthal orders. In such a wellbore logging tool 300, the axial resolution of slowness logs can vary with different sub-array processing. Generally, the axial resolution of an extracted slowness curve is between the receiver to receiver spacing and the array size, which may be from about 0.5 feet to about 6 feet, depending on the size of the sub array. Wellbore tool 300 may be operable to capture four component (4C) dipole waveforms. A four component dipole waveform may be XX, XY, YX, and YY wherein the first letter represents the transmitter direction and the second letter denote the receiver direction. A four component dipole waveform may be captured for each of the receiver stations R disposed in wellbore tool 300.

Figure 4:
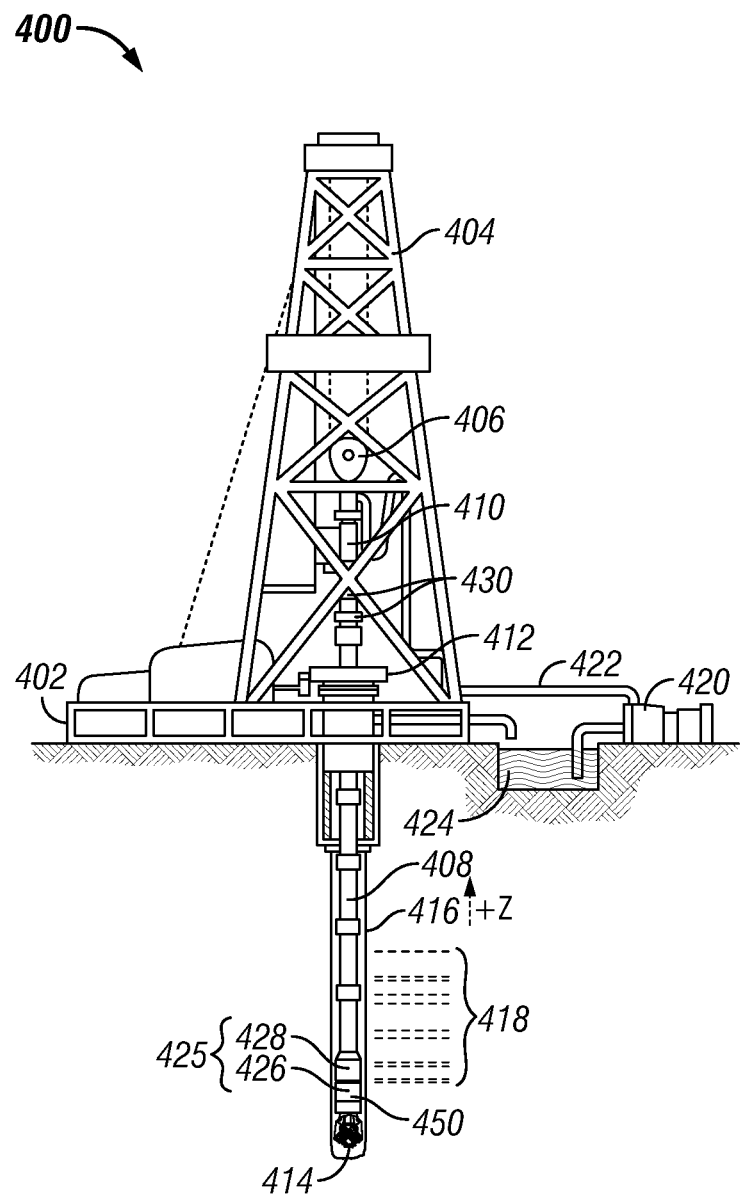
FIG. 4 illustrates a diagrammatic view of an example logging-while-drilling (LWD) wellbore operating environment.

FIG. 4 illustrates a diagrammatic view of an exemplary logging while drilling (LWD) and/or measurement while drilling (MWD) wellbore operating environment 400 in which the present disclosure may be implemented. As depicted in FIG. 1, a drilling platform 402 is equipped with a derrick 404 that supports a hoist 406 for raising and lowering a drill string 408. The hoist 406 suspends a top drive 410 suitable for rotating the drill string 408 and lowering the drill string 408 through the well head 412. Connected to the lower end of the drill string 408 is a drill bit 414. As the drill bit 414 rotates, the drill bit 414 creates a wellbore 416 that passes through various formations 418. A pump 420 circulates drilling fluid through a supply pipe 422 to top drive 410, down through the interior of drill string 408, through orifices in drill bit 414, back to the surface via the annulus around drill string 408, and into a retention pit 424. The drilling fluid transports cuttings from the wellbore 416 into the retention pit 424 and aids in maintaining the integrity of the wellbore 416. Various materials can be used for drilling fluid, including oil-based fluids and water-based fluids.

As depicted in FIG. 4, logging tools 426 may be integrated into the bottom-hole assembly 425 near the drill bit 414. As the drill bit 414 extends the wellbore 416 through the formations 418, logging tools 426 collect measurements relating to various formation properties as well as the orientation of the tool and various other drilling conditions. The bottom-hole assembly 425 may also include a telemetry sub 428 to transfer measurement data to a surface receiver 430 and to receive commands from the surface. In some embodiments, the telemetry sub 428 communicates with a surface receiver 430 using mud pulse telemetry. In other cases, the telemetry sub 428 does not communicate with the surface, but rather stores logging data for later retrieval at the surface when the logging assembly is recovered. Notably, one or more of the bottom-hole assembly 425, the logging tools 426, and the telemetry sub 428 may also operate using a non-conductive cable (e.g. slickline, etc.) with a local power supply, such as batteries and the like. When employing non-conductive cable, communication may be supported using, for example, wireless protocols (e.g. EM, acoustic, etc.) and/or measurements and logging data may be stored in local memory for subsequent retrieval at the surface, as is appreciated by those skilled in the art.

Each of the logging tools 426 may include a plurality of tool components, spaced apart from each other, and communicatively coupled with one or more wires. Logging tools 426 may include tools such as the one shown in FIG. 3 in order to perform acoustic (e.g., "sonic") logging. The telemetry sub 428 may include wireless telemetry or logging capabilities, or both, such as to transmit or later provide information indicative of received acoustic energy/waveforms to operators on the surface or for later access and data processing for the evaluation of formation 418 properties.

The logging tools 426, including the acoustic logging tool, may also include one or more computing devices 450 communicatively coupled with one or more of the plurality of tool components. The computing device 450 may be configured to control or monitor the performance of the logging tools 426, process logging data, and/or carry out the methods of the present disclosure. Computing device 450 may comprise a processor, memory, a data storage medium, and a software program.

In some embodiments, one or more of the logging tools 426 may communicate with a surface receiver 430, such as a wired drillpipe. In other cases, the one or more of the logging tools 426 may communicate with a surface receiver 430 by wireless signal transmission. In at least some cases, one or more of the logging tools 426 may receive electrical power from a wire that extends to the surface, including wires extending through a wired drillpipe. In at least some instances the methods and techniques of the present disclosure may be performed by a computing device (not shown) on the surface. In some embodiments, the computing device may be included in surface receiver 430. For example, surface receiver 430 of wellbore operating environment 400 at the surface may include one or more of wireless telemetry, processor circuitry, or memory facilities, such as to support substantially real-time processing of data received from one or more of the logging tools 426. In some embodiments, data is processed at some time subsequent to its collection, wherein the data may be stored on the surface at surface receiver 430, stored downhole in telemetry sub 428, or both, until it is retrieved for processing.

Figure 5:
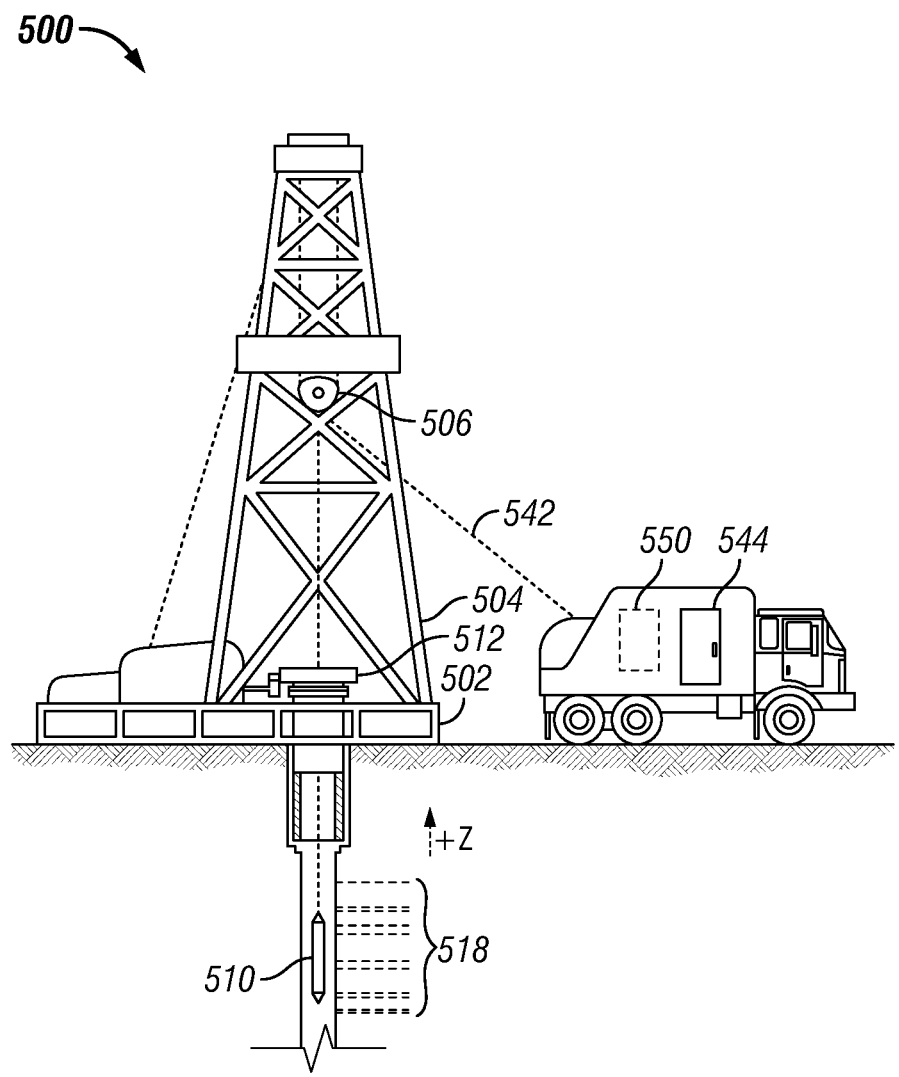
FIG. 5 illustrates a diagrammatic view of an example wireline logging (WL) wellbore operating environment.

FIG. 5 illustrates a diagrammatic view of a conveyance logging wellbore operating environment 500 in which the present disclosure may be implemented. As depicted in FIG. 5, a hoist 506 may be included as a portion of a platform 502, such as that coupled to derrick 504, and used with a conveyance 542 to raise or lower equipment such as acoustic logging tool 510 into or out of a borehole. Acoustic logging tool 510 may include, for example, tools such as the one shown in FIG. 3. A conveyance 542 may provide a communicative coupling between the acoustic logging tool 510 and a logging facility 544 at the surface. The conveyance 542 may include wires (one or more wires), slicklines, cables, or the like, as well as tubular conveyances such as coiled tubing, joint tubing, or other tubulars, and may include a downhole tractor. Additionally, power can be supplied via the conveyance 542 to meet power requirements of the tool. The acoustic logging tool 510 may have a local power supply, such as batteries, downhole generator and the like. When employing non-conductive cable, coiled tubing, pipe string, or downhole tractor, communication may be supported using, for example, wireless protocols (e.g. EM, acoustic, etc.), and/or measurements and logging data may be stored in local memory for subsequent retrieval. The logging facility 544 may include a computing device 550 capable of carrying out the methods and techniques of the present disclosure. In this manner, information about the formation 518 may be obtained by acoustic logging tool 510 and processed by a computing device, such as computing device 550. In some embodiments, computing device 550 is equipped to process the received information in substantially real-time, while in some embodiments, computing device 550 can be equipped to store the received information for processing at some subsequent time.

Figure 6:
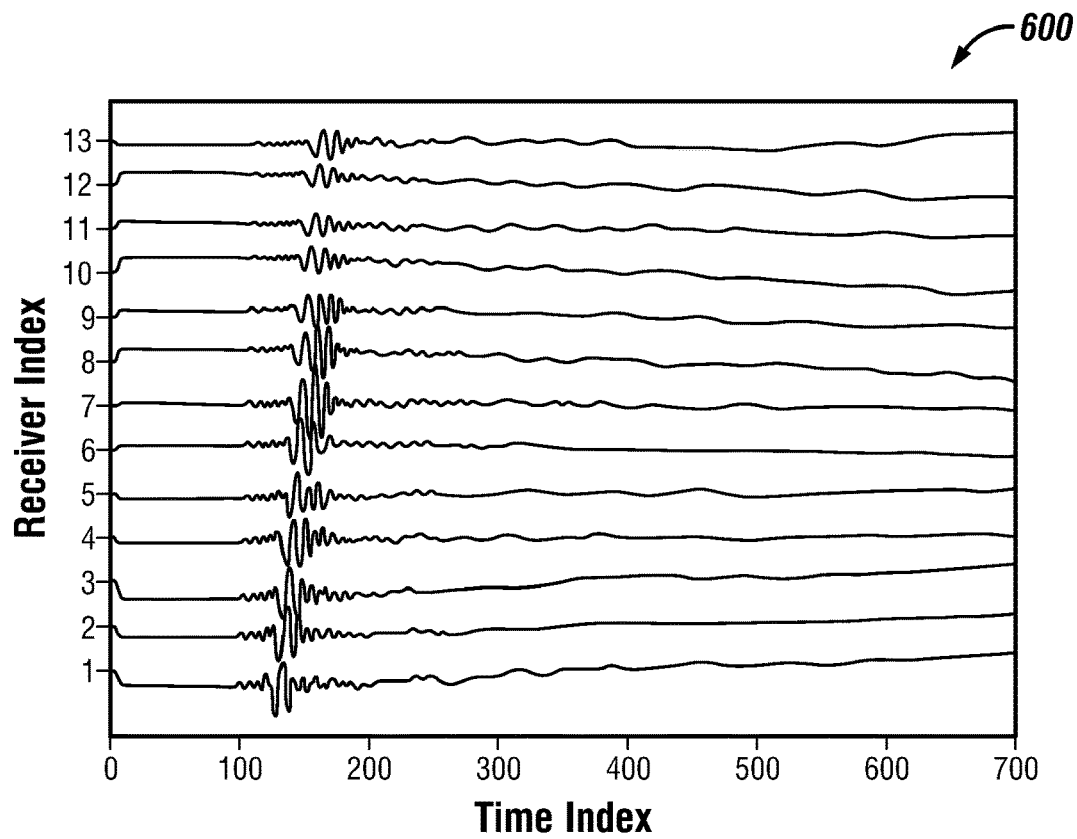
FIG. 6 illustrates example waveform trains of a single depth acquisition.

FIG. 6 depicts exemplary waveform trains 600 of an XX component of a single depth acquisition as recorded by the thirteen receivers of the wellbore tool 300 of FIG. 3. Other components, for example, XY, YX and YY, are similar. At some time index less than 0, transmitter T generated an acoustic wave in a borehole. The acoustic wave then propagates along the borehole, through the transmitter-receiver separation 320, before first reaching receiver $R_1$, as indicated by the fact that receiver $R_1$ is the first to record waveform data. The same acoustic wave continues onward, past receivers $R_2$-$R_{13}$, where it is recorded in turn. Note that, while these 13 waveforms are all a consequence of the same original acoustic wave, they are not identical, with each waveform train containing variations induced by formation properties (desirable) and noise (un-desirable). Additionally, it is noted that waveform trains 600 are representative of a hard formation case, although it is understood that waveform data collected in other formation cases may also be utilized.

Figure 7:
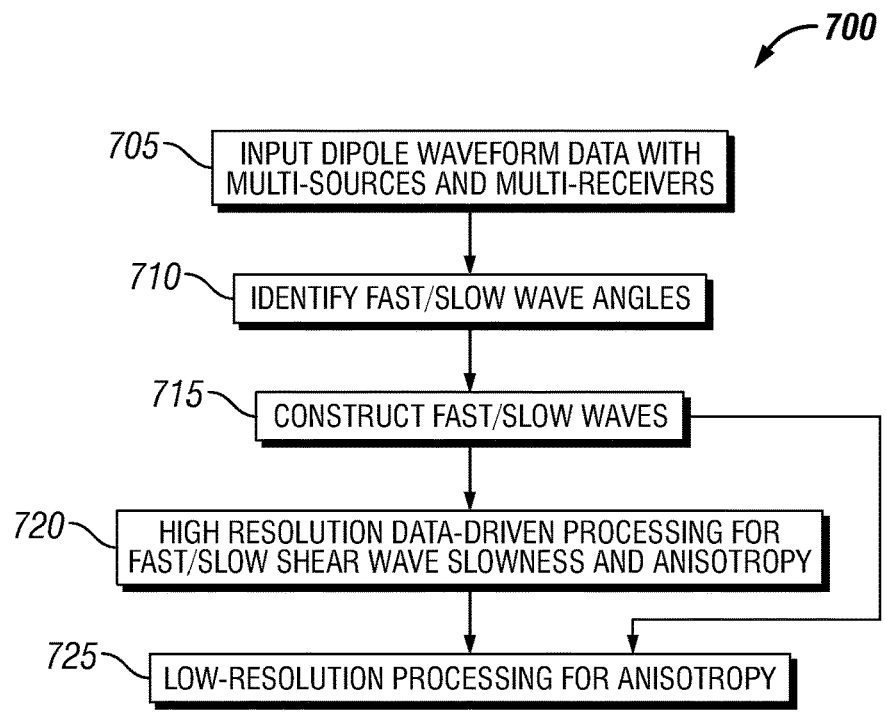
FIG. 7 illustrates a block flow diagram of a method to perform a dispersion-free anisotropy processing with cross-dipole flexural waves.

FIG. 7 illustrates a block flow diagram of a method 700. Method 700 may start at block 705 with the four component dipole waveforms from the wellbore tool previously described in FIGS. 3-5 acting as an input to a processing system. As previously discussed, the four component dipole waveforms may comprise data from transmitters fired from at least two different sources oriented to different azimuths and are captured by at least two different receivers oriented to different azimuths.

In block 710, the processing system may locate a fast wave angle and a slow wave angle caused by formation anisotropy either through minimizing cross-line waveform energy or maximizing or minimizing in-line slowness value. The processing for fast and slow angles can be either performed in time-domain or frequency-domain. A median filter may be applied to smooth the fast and slow angles to enhance the accuracy of the angle curves.

In block 715, the processing system may use the computed angle curves to compute fast and slow waves. As will be described in further detail below, there may be several techniques to processing the computed fast and slow waves by rotating waveform angles, and these techniques may have different reference depths. For example, a technique that utilizes a semblance of waveform captured by receivers of different axial positions, the reference depth point of the angle may be the middle point of a receiver array. Another processing technique may comprise matching the fast and slow waves. In such a technique, a reference depth may be a middle point between the source and receiver.

The constructed fast and slow waves may be passed to block 720 or 725 depending on processing technique chosen in block 715 and by extension, the reference depth selected. The constructed fast and slow wavefrom data, with a reference depth of the middle point of the receiver array, may be passed to block 720. In block 720, high-resolution data-driven processing may output fast and slow shear wave slowness and anisotropy. Block 720 may implement a model-constrained data-driven processing method to acquire the shear wave anisotropy of both the near-borehole formation and the virgin formation. The constructed fast and slow wavefrom data with a reference depth of the middle point inbetween the transmitter and the receiver array may then be passed to block 725 for further low resolution processing. Block 725 may implement a simplified anisotropy dispersion model built to match the anisotropy response in frequency domain.

In the instance where the processing technique in block 715 is selected such that the constructed fast and slow wavefrom data has a reference angle depth at the middle point between source and receiver, the constructed fast and slow wavefrom data may be sent to block 725 where a simplified anisotropy dispersion model built to match the anisotropy response in frequency domain may be applied. In formations where anisotropy is relatively low, the high resolution phase difference between receivers may be small which may yield poor results if the constructed fast and slow waveform data is input into the high-resolution data-driven processing method in block 720. In such formations, or for the particular section of a formation that exhibits relatively low anisotropy, the simplified anisotropy dispersion model built to match the source-to-receiver-resolution anisotropy response may be appropriate to use.

A first step of horizontal transverse isotropy analysis may be to determine the fast and slow shear wave plane and angle and obtain the fast and slow waveform data for further analysis. Because the fast and slow shear wave angle may not change vastly versus depth, the method described herein may determine the fast wave angle with low-axis-resolution approaches as such approaches may be stable and sensitive to even a small degree of anisotropy thanks to the storage effect of anisotropy between the transmitter and the receiver. For example, the fast and slow wave plane may be estimated by the minimizing the cross line wave energy as illustrated in Equation 1.

$$\min(\Sigma |XY_\theta| + |YX_\theta|) \qquad (1)$$

Where $XY_\theta$ and $YX_\theta$ are cross line components after numerically rotating the 4C data about an azimuth of θ by Alford rotation. In general, the angle between the X-direction and the fast and slow shear azimuth may be obtained by solving the simplified expression in Equation 2.

$$\Sigma |\sin 2\theta (XX(t)-YY(t))-\cos 2\theta (XY(t)+YX(t))|=0 \qquad (2)$$

Equation 2 may be minimized to determine an azimuth of fast or slow waves, but Equation 2 cannot identify if it is a fast wave angle or a slow wave angle. To identify the fast or slow waves the method compares the travel time of $XX_\theta$ and $YY_\theta$ by matching the arrivals in a designed time-window as in Equation 3.

$$\min(\Sigma |XX_\theta(t+\Delta t)-YY_\theta(t)|) \qquad (3)$$

In Equation 3, Δt is the time difference between arrivals in XX waveforms and YY waveforms, θ is the estimated angle minimizing cross-component energy with equation 2. The data from all receives can be combined and Equation 3 may be re-written to Equation 16.

$$\min\left[\Sigma_{n=1 \sim N} \Sigma_t \left| XX_\theta \left( t + \Delta t * \frac{z_{Rn} - z_S}{z_{Rf} - z_S} \right) - YY_\theta(t) \right| \right] \qquad (4)$$

In Equation 4, $z_{Rn}$, $z_{Rf}$, and $z_S$ are the axial position of the nth receiver, the reference receiver, and the source, respectively. Additionally, n is the receiver index and N is the total number of receivers. A low-frequency band-pass filter may be applied to the raw waveform before matching the arrivals. If Δt is positive, the XX is oriented to fast wave plane and θ is the fast wave azimuth. Otherwise, the YY is oriented to fast wave azimuth, and the fast wave azimuth is θ+90. The Δt could further be converted to an apparent anisotropy in between the source and the receiver by Equation 5.

$$\lambda_a = \frac{2\Delta t}{(z_{Rf} - z_s)(S_f^{S-R} + S_s^{S-R})} \qquad (5)$$

In Equation 5, $S_f^{S-R} + S_s^{S-R}$ are averaged fast and slow shear slowness in between source and receiver and $Z_R$ and $Z_s$ are the axial position of the reciever and source.

Equation 6 illustrates a jump-rejecting procedure that may be performed to prevent 90° jumps of estimated fast wave azimuth.

$$\theta' = \mod\left(\theta + \frac{\pi}{2}, \pi\right) \text{ if } |\hat{\theta} - \theta| > \theta_{th} \qquad (6)$$
$$\theta' = \theta \qquad \text{else}$$

Figure 8:
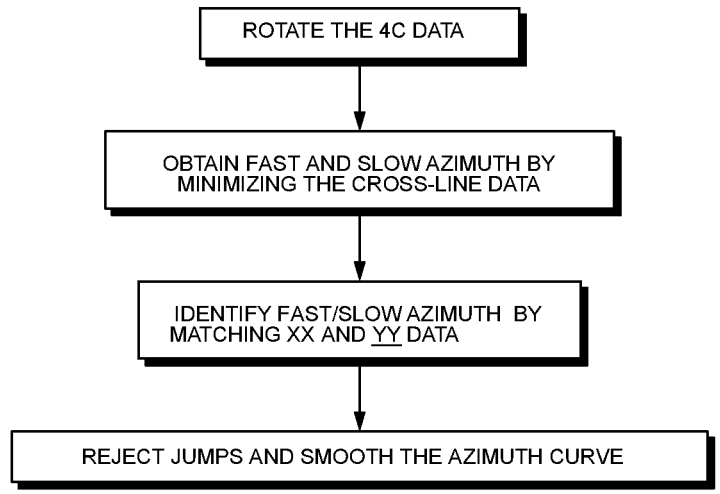
FIG. 8 illustrates a block flow diagram of a method to identify a fast wave azimuth.

In Equation 6, $\hat{\theta}$ represents the mean value of the estimate fast shear azimuth in certain depth range, $\theta_{th}$ represents a threshold for determination. After removing unreasonable jumps, the fast azimuth curve may be smoothed to gain better accuracy. The workflow to identify the fast wave azimuth is summarized in FIG. 8.

Figure 9:
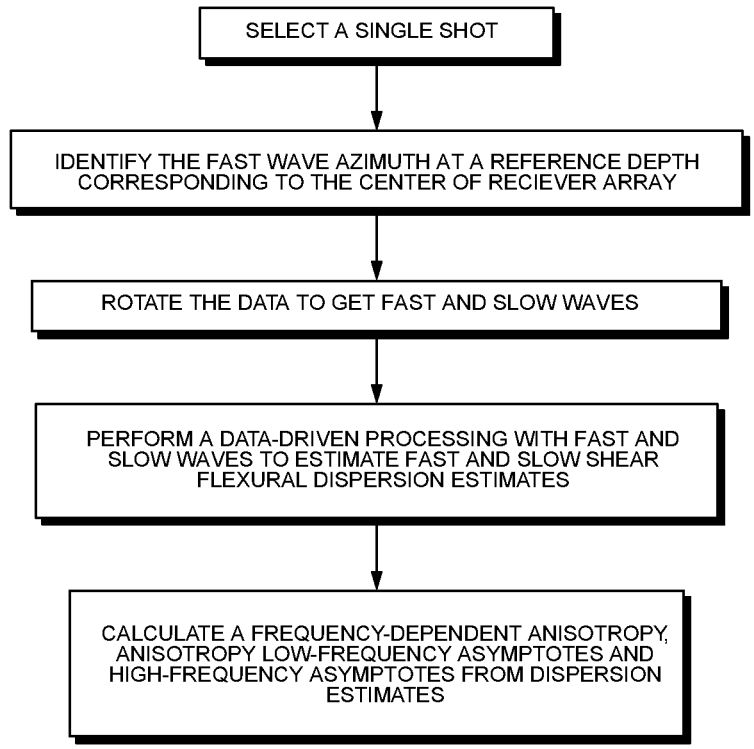
FIG. 9 illustrates a block flow diagram of a method for array-size-resolution processing.

After the fast wave is obtained, data processing may be performed in the frequency-domain to compute the final dispersion-free shear slowness and anisotropy. FIG. 9 illustrates a block flow diagram of performing an array-size-resolution data-driven processing for shear wave anisotropy. The method may start by select a single shot and then identifying the fast wave azimuth of the shot. For array-size-resolution shear anisotropy processing, the reference depth is at the center of this receiver array. The raw waveform data is rotated via Alford rotation to obtain fast and slow waves. Thereafter, the data-driven approach may be applied to the rotated waveforms to obtain a flexural dispersion curve for each of the fast and slow waves, for example, as described in the method in WO2017172810A1. As used herein, data-driven means the method may be governed by the data and errors generated by inaccurate models may be adaptively accounted for. After the flexural dispersion curves processing, a frequency-dependent anisotropy curve may be determined using Equation 7.

$$Ani(f) = 2 \frac{S_{FL}^s(f) - S_{FL}^f(f)}{[S_{FL}^f(f) + S_{FL}^s(f)] Sens(f)} \qquad (7)$$

In Equation 7, $S_{FL}^s$ and $S_{FL}^f$ represent flexural dispersion estimates for slow waves and fast waves, respectively, with a model constrained data-driven approach. The term sens(f) represents flexural sensitivity of shear wave slowness. The slow and fast shear slowness may be directly read from the low-frequency asymptote of $S_{FL}^s$(f) and $S_{FL}^f$(f). The shear wave anisotropy can be directly obtained from the low-frequency asymptote of Ani(f). Using data-driven processing, dispersion-free fast and slow shear wave slowness and corresponding anisotropy may be obtained. Additionally, the frequency-based processing results may have a wider application range than processing in the time-domain which may be used in advanced rock physics study. For example, the distribution of anisotropy upon frequencies may be used to determine the anisotropy cause. In the instance that Ani(f) is positive at full frequencies indicates fracture caused anisotropy or intrinsic anisotropy. Alternatively, in the instance that Ani(f) changes signs as frequency increase indicates stress-concentration caused anisotropy. For an irregular borehole, the anisotropy might exist only in a certain frequency range. This anisotropy cause may be further confirmed with image logs and caliper data.

Array-size-resolution processing may produce poor results when the phase difference between receivers may be small such as in formations with relatively low-level anisotropy, for example, when the anisotropy degree is lower than 1%. For such formations, an alternative method may be to increase the accuracy by decreasing the axial-resolution. Next, we will show the workflow of performing a frequency-domain based low-resolution processing of the invention.

Figure 10:
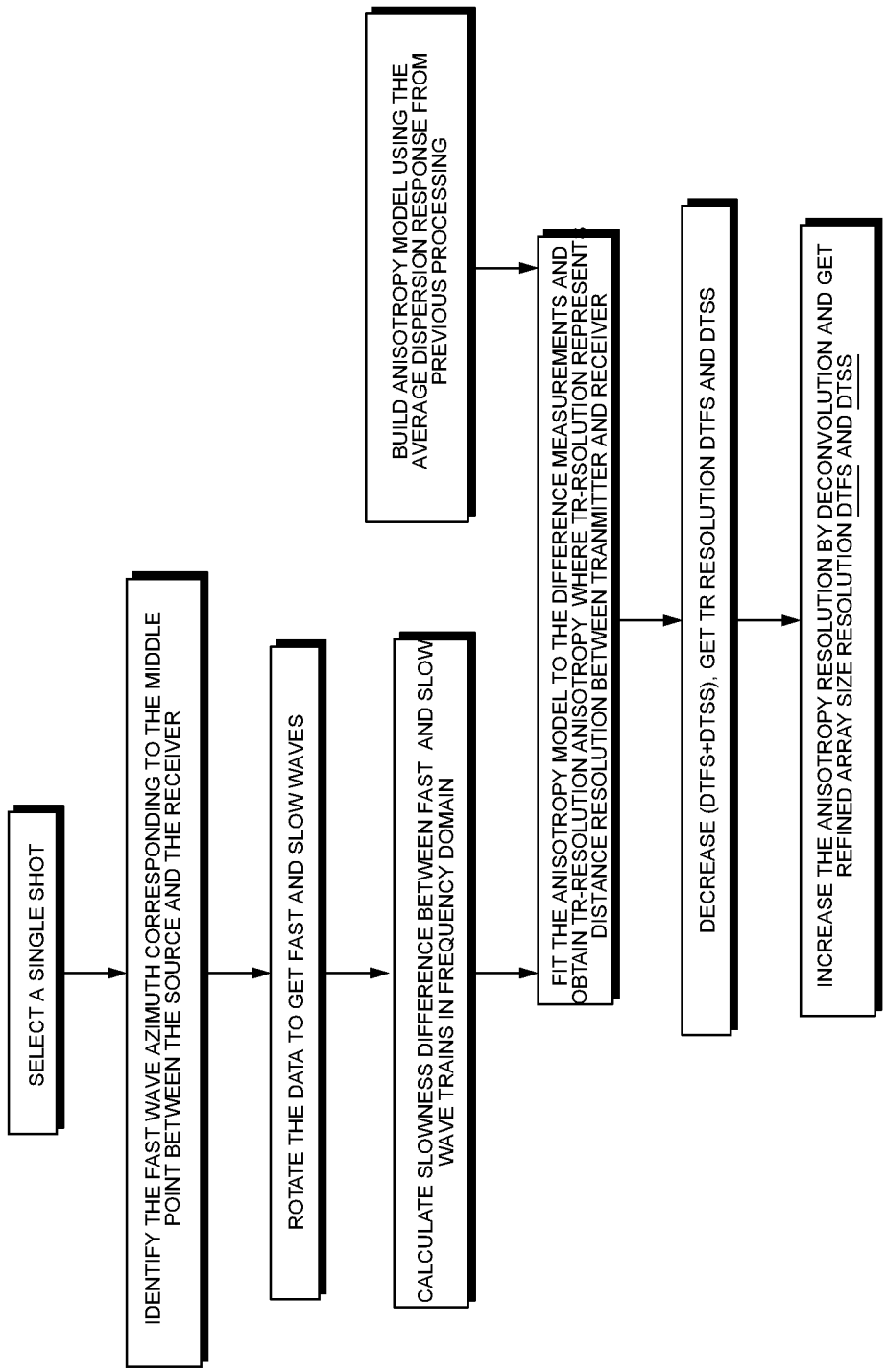
FIG. 10 illustrates a block flow diagram of a method for source-to receiver-size-resolution processing.
Figure 11:
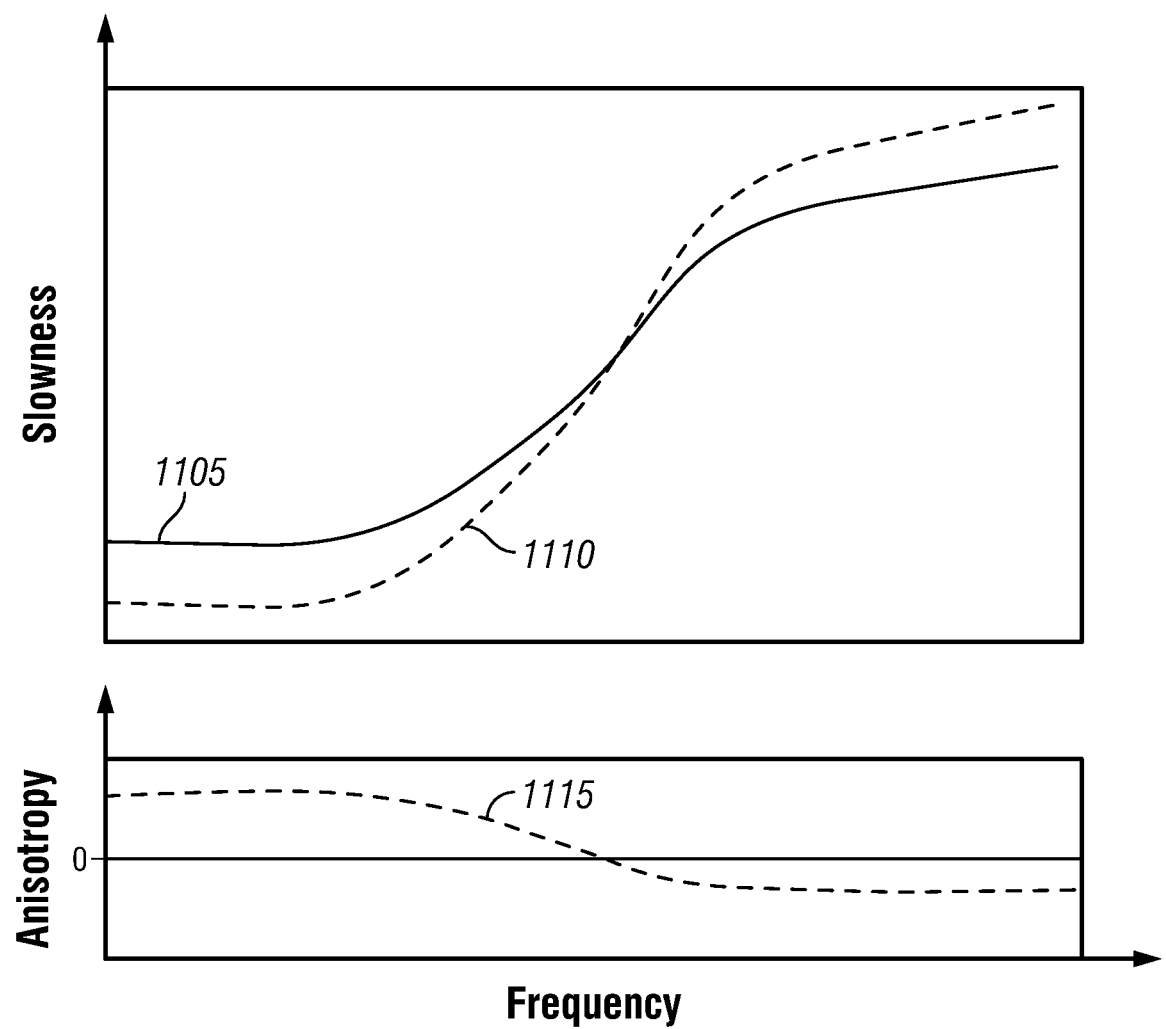
FIG. 11 illustrates a reference dispersion curve and a method to generate a frequency-domain anisotropy model.

FIG. 10 illustrates a block flow diagram a method of source-to-receiver resolution processing for shear anisotropy. The method may comprise selecting data of a single shot and then rotating the data for fast and slow waves with previously estimated azimuth information. The rotations are then transformed into frequency domain using a fast Fourier transform (FFT) as shown in Equations 8 and 9.

$$WS_{FW}(f) = FFT[FW(t)] \qquad (8)$$

$$WS_{SW}(f) = FFT[SW(t)] \qquad (9)$$

Where FW(t) and SW(t) represent the fast and slow flexural data in the time domain and $WS_{FW}(t)$ and $WS_{SW}(t)$ represent the fast and slow flexural data in the frequency domain respectively. A wave matching process may be performed in the frequency domain using Equation 10.

$$\min\left[\sum_{n=1\sim N}\left|WS_{FW}^{Rn}(f)e^{\left(i2\pi f\left(\Delta t_{mear}(f)*\frac{z_{Rn}-z_S}{z_{Rf}-z_S}\right)\right)} - WS_{SW}^{Rn}(f)\right|\right] \quad (10)$$

Where $\Delta t_{mear}(f)$ represents the measured travel time difference between fast waves and slow waves, and it is extracted by minimizing the value of Equation 10. Further, the slowness difference may be determined by Equation 11.

$$\Delta s_{mear}(f) = \frac{\Delta t_{mear}(f)}{z_{Rf}-z_s} \quad (11)$$

Where $\Delta s_{mear}(f)$ represents the measured slowness different between fast and slow waves in between the transmitter and receiver. An anisotropy model for fast and slow waves in terms of slowness difference may be built for advanced interpretation and processing for dispersion-free anisotropy. For example, an empirical mathematical model using slowness difference between fast and slow waves may be used to model anisotropy. An example of a model is shown in Equation 12.

$$\Delta s_{model}(f) = \Delta s_0 - \Delta s'\left[0.5 + \frac{\tanh(xf-t)}{2}\right] \quad (12)$$

Where $\Delta s_0$ represents slowness difference at the low-frequency asymptote and $\Delta s_0-\Delta s'$ represents slowness difference at high-frequency asymptotes. This anisotropy model may alternatively be built from the model of Equation 13 with dispersion estimates from high-resolution processing. FIG. 11 illustrates a reference dispersion curve 1105 which may be used to build an anisotropy model. FIG. 11 further illustrates modified dispersion curve 1110 and slowness difference 1115. A first step may be to average obtained dispersion curves by smoothing all the array-resolution fast or slow wave dispersion estimates in the depth between source and receiver to obtain a reference dispersion curve for the anisotropy model. The reference dispersion may be referred to as $s_{FL}^{AVG}(f)$. An anisotropy model in terms of slowness difference may then be obtained from Equation 13.

$$\Delta s_{model}(f) = [\Delta s_0 + s_{FL}^{AVG}(af)*b] - s_{FL}^{AVG}(f) \quad (13)$$

Where $\Delta s_0 + s_{FL}^{AVG}(af)*b$ represents a modified dispersion curve with respect to the reference dispersion curve. The difference between the modified and the reference dispersion curve may provide a model to predict anisotropy value versus frequencies. Furthermore, $\Delta s_0$ and parameters a and b may be inverted by Equation 14 by optimization processing.

$$\min\{|\Delta s_0 + s_{FL}^{AVG}(af)*b| - s_{FL}^{AVG}(f) - \Delta s_{mear}(f)\} \quad (14)$$

Once the optimized $\Delta s_0$, a, and b are obtained the anisotropy value may be determined by Equation 15. In Equation 15, shear wave anisotropy can be directly obtained from the low-frequency asymptote of Ani(f). The anisotropy obtained by Equation 15 is of low-resolution.

$$Ani(f) = 2\frac{[\Delta s_0 + s_{FL}^{AVG}(af)*b] - s_{FL}^{AVG}(f)}{s_{FL}^{AVG}(f)Sens(f)} \quad (15)$$

To obtain fast and slow shear wave slowness having the same resolution, the fast and slow shear wave slowness curves may be smoothed to get a slowness curve of low resolution. Thereafter, the curves may be rebuilt with the anisotropy estimates. Additionally, the anisotropy resolution may be increased by deconvolution processing and thereafter using the previously disclosed high-resolution anisotropy parameter to refine array-size-resolution for the fast and slow shear slowness.

Discussed above are methods and systems for improving current technology. Specifically, improving the quality of electrical images that may be used to determine formation properties. Current problems faced by acoustic logging tools that use flexural waves may be that flexural waves are dispersive. Dispersion may be affected by multi-factors in a borehole environment, and any anisotropy processing performed with the energetic part of flexural waves may provide biased anisotropy estimates of shear wave slowness and poor quality electrical images. Poor quality electrical images make drilling operations and/or production operations difficult. Operators may make improper decisions based off low quality images. This may extend drilling time, increase costs, reduce the safety of well, reduce production, and/or negatively affect other performance variables of the well. There is a need to produce high quality electrical images that are reliable. Specifically, the methods and system may eliminate effects that cause inaccuracies in the imaging data, such as noise. Increasing sharpness and contract of the electrical images.

In examples, the method and systems may use multi-frequency logging data. Once a mud removal technique is applied and formation resistivity is low, results at different frequencies may match if the mud angle selection is correct. Therefore, mud angles that minimize the difference between different frequencies (or maximize correlation between frequencies) may be found. Disclosed methods and systems separate themselves from current technology by using multi-frequency data to improve determination of mud angles. In addition, the methods may find mud angles that minimize differences between multi-frequency data after processing and may employ correlation of multi-frequency data to determine optimal mud angles. Furthermore, methods may use data from higher frequencies that may have minimal mud effect in addition to processed data for optimization any may use imaging data for finding the optimal mud angles without special mud angle measurements. Systems may also find a suitable range of data from the image log for performing mud optimization methods. Increasing the quality of the images improves the interpretation of data, which is sued to determine petrophysical answer products such as formation lithology, sedimentology, and location and size of fractures.

Accordingly, this disclosure describes apparatus, methods, and compositions that may relate to subterranean operations. The apparatus, methods, and compositions may further be characterized by one or more of the following statements:

Statement 1. A method comprising: disposing an acoustic logging tool in a wellbore, wherein the acoustic logging tool comprises a transmitter and a receiver; emitting a flexural wave from the transmitter; recording a four component dipole waveform with the receiver, wherein the four component dipole waveform comprises XX, XY, YX, and YY components; rotating the four component dipole waveform using Alford rotation to produce rotated waveform components, wherein the rotated waveform components comprise $XX_\Theta$, $XY_\Theta$, $YX_\Theta$, and $YY_\Theta$ components; comparing a travel time of $XX_\Theta$ and $YY_\Theta$ components to identify a fast wave and a slow wave from the rotated waveform components; processing the fast wave and the slow wave using high-resolution data-driven processing to obtain a fast wave flexural dispersion curve and a slow wave flexural dispersion curve; determining a frequency dependent anisotropy curve using the fast wave flexural dispersion curve and the slow wave flexural dispersion curve; and determining a low-resolution shear anisotropy.

Statement 2. The method of statement 1 wherein the transmitter comprises a dipole.

Statement 3. The method any preceding statement wherein the transmitter comprises a first transmitter configured to transmit in a first direction and a second transmitter configured to transmit in a second direction, wherein the first transmitter and second transmitter are not at the same elevation on the acoustic logging tool.

Statement 4. The method of any preceding statement wherein the receiver is operable to capture a cross-dipole acoustic field.

Statement 5. The method of any preceding statement wherein comparing an arrival time comprises matching arrival times in a specified time window using the following equation: $\min(\Sigma|XX_\Theta(t+\Delta t)-YY_\Theta(t)|)$ where $XX_\Theta(t+\Delta t)$ and $YY_\Theta(t)$ are rotated waveform components at the specified time and $\Delta t$ is a time difference in arrival between the XX component and the YY component.

Statement 6. The method of any preceding statement further comprising applying a smoothing function before processing the fast wave and the slow wave, wherein the smoothing function comprises:

$$\theta' = \mathrm{mod}\left(\theta + \frac{\pi}{2}, \pi\right) \text{ if } |\hat{\theta} - \theta| > \theta_{th}\ \theta' = \theta \text{ else}$$

where $\hat{\theta}$ represents a mean value of an estimate of fast shear azimuth and $\theta_{th}$ represents a threshold of determination.

Statement 7. The method of any preceding statement wherein determining a frequency dependent anisotropy curve comprises solving the following equation:

$$Ani(f) = 2\frac{S_{FL}^s(f) - S_{FL}^f(f)}{[S_{FL}^f(f) + S_{FL}^s(f)]Sens(f)}$$

where $S_{FL}^s$ is flexural dispersion estimates for the slow wave, $S_{FL}^f$ is flexural dispersion estimates for the slow wave represent and the fast wave, sens(f) is flexural sensitivity of shear wave slowness, and Ani(f) is a low-frequency asymptote.

Statement 8. The method of statement 7 wherein the determining of the frequency dependent anisotropy curve is done in the frequency domain.

Statement 9. The method of any preceding statement wherein determining a low-resolution shear anisotropy comprises: preparing an anisotropy model from the frequency dependent anisotropy curve; fitting the anisotropy model to a difference measurement; and determining a transmission/receiver resolution anisotropy.

Statement 10. The method of any preceding statement wherein fitting the anisotropy model comprises determining: $\Delta s_{model}(f)=[\Delta s_0+s_{FL}^{AVG}(af)*b]-s_{FL}^{AVG}(f)$, where $\Delta s_{model}(f)$ is the difference between the anisotropy model and the difference measurement, $\Delta s_0$ is a variable, a is a variable, b is a variable, and $s_{FL}^{AVG}(f)$ is an average value of the anisotropy model for a fast wave at a specified frequency.

Statement 11. The method of any preceding statement wherein the variables $\Delta s_0$, a, and b are deterinined by the following equation: $\min\{|\Delta s_0+s_{FL}^{AVG}(af)*b|-s_{FL}^{AVG}(f)-\Delta s_{mear}(f)\}$, where $\Delta s_{mear}(f)$ is the measured slowness difference between fast and slow waves between the transmitter and receiver.

Statement 12. The method of any preceding statement wherein $\Delta s_{mear}(f)$ is determined by:

$$\Delta s_{mear}(f) = \frac{\Delta t_{mear}(f)}{z_{Rf} - z_s},$$

where $\Delta t_{mear}(f)$ is the measured time difference between the fast wave and the slow wave, $z_{Rf}$ is an axial position of a reference receiver, and $z_s$ is an axial position of a source receiver.

Statement 13. A method of low-resolution processing for anisotropy comprising: disposing an acoustic logging tool in a wellbore, wherein the acoustic logging tool comprises a transmitter and a receiver; emitting a flexural wave from the transmitter; recording a four component dipole waveform with the receiver, wherein the four component dipole waveform comprises XX, XY, YX, and YY components; identifying a fast wave azimuth and slow wave azimuth corresponding to a middle point between the transmitter and the receiver; rotating the four component dipole waveform using Alford rotation to produce rotated waveform components, wherein the rotated waveform components comprise $XX_\Theta$, $XY_\Theta$, $YX_\Theta$, and $YY_\Theta$ components; transforming the rotated waveform components into a frequency domain using a Fourier transform; determining a slowness difference between the fast wave azimuth and slow wave azimuth in the frequency domain; preparing an anisotropy model from the frequency dependent anisotropy curve; fitting the anisotropy model to a difference measurement; and determining a transmission/receiver resolution anisotropy.

Statement 14. The method of statement 13 wherein fitting the anisotropy model comprises determining: $\Delta s_{model}(f)=[\Delta s_0+s_{FL}^{AVG}(af)*b]-s_{FL}^{AVG}(f)$ where $s_{model}(f)$ is the difference between the anisotropy model and the difference measurement, $\Delta s_0$ is a variable, a is a variable, b is a variable, and $s_{FL}^{AVG}(f)$ is an average value of the anisotropy model for a fast wave at a specified frequency.

Statement 15. The method of any of statements 13-14 wherein the variables $\Delta s_0$, a, and b are determined by the following equation: $\min\{|\Delta s_0+s_{FL}^{AVG}(af)*b|-s_{FL}^{AVG}(f)-\Delta s_{mear}(f)\}$ where $\Delta s_{mear}(f)$ is the measured slowness difference between fast and slow waves between the transmitter and receiver.

Statement 16. The method of any of statements 13-15 wherein $\Delta s_{mear}(f)$ is determined by:

$$\Delta s_{mear}(f) = \frac{\Delta t_{mear}(f)}{z_{Rf} - z_s}$$

where $\Delta t_{mear}(f)$ is the measured time difference between the fast wave and the slow wave, $z_{Rf}$ is an axial position of a reference receiver, and $z_s$ is an axial position of a source receiver.

Statement 17. The method of any of statements 13-16 further comprising increasing a resolution of the transmission/receiver resolution anisotropy by deconvolution.

Statement 18. A well measurement system comprising: an acoustic logging tool, wherein the acoustic logging tool comprises: at least one receiver; and at least one transmitter; a conveyance, wherein the conveyance is attached to the acoustic logging tool; and an information handling system, wherein the information handling system is configured to compute a high resolution-shear wave slowness and anisotropy by data-driven processing and compute a transmission/receiver resolution anisotropy.

Statement 19. The system of any of statements 13-17 wherein the at least one receiver and at least one transmitter are configured to generate a four component dataset.

Statement 20. The system of any of statements 13-18 wherein the system further comprises a frequency-domain anisotropy model.

The preceding description provides various examples of the wellbore tools and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

What is claimed is:

1. A method comprising:
    disposing an acoustic logging tool in a wellbore, wherein the acoustic logging tool comprises a transmitter and a receiver;
    emitting a flexural wave from the transmitter;
    recording a four component dipole waveform with the receiver, wherein the four component dipole waveform comprises XX, XY, YX, and YY components;
    rotating the four component dipole waveform using Alford rotation to produce rotated waveform components, wherein the rotated waveform components comprise $XX_\Theta$, $XY_\Theta$, $YX_\Theta$, and $YY_\Theta$ components;
    comparing a travel time of $XX_\Theta$ and $YY_\Theta$ components to identify a fast wave and a slow wave from the rotated waveform components;
    processing the fast wave and the slow wave using high-resolution data-driven processing to obtain a fast wave flexural dispersion curve and a slow wave flexural dispersion curve;
    determining a frequency dependent anisotropy curve using the fast wave flexural dispersion curve and the slow wave flexural dispersion curve;
    preparing an anisotropy model from the frequency dependent anisotropy curve; and
    determining a shear anisotropy from at least the anisotropy model.

2. The method of claim 1 wherein the transmitter comprises a dipole.

3. The method of claim 1 wherein the transmitter comprises a first transmitter configured to transmit in a first direction and a second transmitter configured to transmit in a second direction, wherein the first transmitter and second transmitter are not at the same elevation on the acoustic logging tool.

4. The method of claim 1 wherein the receiver is operable to capture a cross-dipole acoustic field.

5. The method of claim 1 wherein comparing the travel time comprises matching travel times in a specified time window using the following equation:

$$\min(\Sigma |XX_\Theta(t+\Delta t) - YY_\Theta(t)|)$$

where $XX_\Theta(t+\Delta t)$ and $YY_\Theta(t)$ are rotated waveform components at the specified time and $\Delta t$ is a time difference in arrival between the XX component and the YY component.

6. The method of claim 1 further comprising applying a smoothing function before processing the fast wave and the slow wave, wherein the smoothing function comprises:

$$\theta' = \mathrm{mod}\!\left(\theta + \frac{\pi}{2}, \pi\right) \quad \text{if } |\hat{\theta} - \theta| > \theta_{th}$$
$$\theta' = \theta \qquad \text{else}$$

where $\hat{\theta}$ represents a mean value of an estimate of fast shear azimuth and $\theta_{th}$ represents a threshold of determination.

7. The method of claim 1 wherein determining a frequency dependent anisotropy curve comprises solving the following equation:

$$Ani(f) = 2\frac{S_{FL}^s(f) - S_{FL}^f(f)}{[S_{FL}^f(f) + S_{FL}^s(f)]Sens(f)}$$

where $S_{FL}^s$ is flexural dispersion estimates for the slow wave, $S_{FL}^f$ is flexural dispersion estimates for the fast wave, sens(f) is flexural sensitivity of shear wave slowness, and Ani(f) is a low-frequency asymptote.

8. The method of claim 7 wherein the determining the frequency dependent anisotropy curve is done in the frequency domain.

9. The method of claim 1 wherein determining the low-resolution of shear anisotropy comprises:
- fitting the anisotropy model to a difference measurement; and
- determining a transmission/receiver resolution anisotropy.

10. The method of claim 9 wherein fitting the anisotropy model comprises determining:

$$\Delta s_{model}(f)=[\Delta s_0+s_{FL}^{AVG}(af)*b]-s_{FL}^{AVG}(f)$$

where $\Delta s_{model}(f)$ is the difference between the anisotropy model and the difference measurement, $\Delta s_0$ is a variable, a is a variable, b is a variable, and $s_{FL}^{AVG}(f)$ is an average value of the anisotropy model for a fast wave at a specified frequency.

11. The method of claim 10 wherein the variables $\Delta s_0$, a, and b are determinined by the following equation:

$$\min\{|\Delta s_0+s_{FL}^{AVG}(af)*b|-s_{FL}^{AVG}(f)-\Delta s_{mear}(f)\}$$

where $\Delta s_{mear}(f)$ is the measured slowness difference between fast and slow waves between the transmitter and receiver.

12. The method of claim 11 wherein $\Delta s_{mear}(f)$ is determined by:

$$\Delta s_{mear}(f) = \frac{\Delta t_{mear}(f)}{z_{Rf} - z_s}$$

where $\Delta t_{mear}(f)$ is the measured time difference between the fast wave and the slow wave, $z_{Rf}$ is an axial position of a reference receiver, and $z_s$ is an axial position of a source receiver.

13. A method for processing anisotropy comprising:
- disposing an acoustic logging tool in a wellbore, wherein the acoustic logging tool comprises a transmitter and a receiver;
- emitting a flexural wave from the transmitter;
- recording a four component dipole waveform with the receiver, wherein the four component dipole waveform comprises XX, XY, YX, and YY components;
- identifying a fast wave azimuth and slow wave azimuth corresponding to a middle point between the transmitter and the receiver;
- rotating the four component dipole waveform using Alford rotation to produce rotated waveform components, wherein the rotated waveform components comprise $XX_\Theta$, $XY_\Theta$, $YX_\Theta$, and $YY_\Theta$ components;
- transforming the rotated waveform components into a frequency domain using a Fourier transform;
- determining a slowness difference between the fast wave azimuth and slow wave azimuth in the frequency domain;
- preparing an anisotropy model from a frequency dependent anisotropy curve;
- fitting the anisotropy model to a difference measurement; and
- determining a shear anisotropy from at least the anisotropy model.

14. The method of claim 13 wherein the fitting the anisotropy model comprises determining:

$$\Delta s_{model}(f)=[\Delta s_0+s_{FL}^{AVG}(af)*b]-s_{FL}^{AVG}(f)$$

where $\Delta s_{model}(f)$ is the difference between the anisotropy model and the difference measurement, $\Delta s_0$ is a variable, a is a variable, b is a variable, and $s_{FL}^{AVG}(f)$ is an average value of the anisotropy model for a fast wave at a specified frequency.

15. The method of claim 14 wherein the variables $\Delta s_0$, a, and b are determined by the following equation:

$$\min\{|\Delta s_0+s_{FL}^{AVG}(af)*b|-s_{FL}^{AVG}(f)-\Delta s_{mear}(f)$$

where $\Delta s_{mear}(f)$ is the measured slowness difference between fast and slow waves between the transmitter and receiver.

16. The method of claim 15 wherein $\Delta s_{mear}(f)$ is determined by:

$$\Delta s_{mear}(f) = \frac{\Delta t_{mear}(f)}{z_{Rf} - z_s}$$

where $\Delta t_{mear}(f)$ is the measured time difference between the fast wave and the slow wave, $z_{Rf}$ is an axial position of a reference receiver, and $z_s$ is an axial position of a source receiver.

17. The method of claim 13 further comprising increasing a resolution of the shear anisotropy by deconvolution.

18. A well measurement system comprising:
- an acoustic logging tool, wherein the acoustic logging tool comprises:
  - at least one receiver; and
  - at least one transmitter;
- a conveyance, wherein the conveyance is attached to the acoustic logging tool; and
- a computing device, wherein the computing device is configured to compute a high resolution-shear wave slowness, prepare an anisotropy model from the frequency dependent anisotropy curve, and determine a shear anisotropy from at least the anisotropy model.

19. The system of claim 18 wherein the at least one receiver and at least one transmitter are configured to generate a four component dataset.

20. A method comprising:
- disposing an acoustic logging tool in a wellbore, wherein the acoustic logging tool comprises a transmitter and a receiver;
- emitting a flexural wave from the transmitter;
- recording a four component dipole waveform with the receiver, wherein the four component dipole waveform comprises XX, XY, YX, and YY components;
- rotating the four component dipole waveform using Alford rotation to produce rotated waveform components, wherein the rotated waveform components comprise $XX_\Theta$, $XY_\Theta$, $YX_\Theta$, and $YY_\Theta$ components;
- comparing a travel time of $XX_\Theta$ and $YY_\Theta$ components to identify a fast wave and a slow wave from the rotated waveform components wherein comparing the travel time comprises matching travel times in a specified time window using the following equation:

$$\min(\Sigma|XX_\Theta(t+\Delta t)-YY_\Theta(t)|)$$

where $XX_\Theta(t+\Delta t)$ and $YY_\Theta(t)$ are rotated waveform components at the specified time and $\Delta t$ is a time difference in arrival between the XX component and the YY component;
- processing the fast wave and the slow wave using high-resolution data-driven processing to obtain a fast wave flexural dispersion curve and a slow wave flexural dispersion curve;

determining a frequency dependent anisotropy curve using the fast wave flexural dispersion curve and the slow wave flexural dispersion curve; and determining a shear anisotropy.

21. A method comprising:

disposing an acoustic logging tool in a wellbore, wherein the acoustic logging tool comprises a transmitter and a receiver;

emitting a flexural wave from the transmitter;

recording a four component dipole waveform with the receiver, wherein the four component dipole waveform comprises XX, XY, YX, and YY components;

rotating the four component dipole waveform using Alford rotation to produce rotated waveform components, wherein the rotated waveform components comprise $XX_\Theta$, $XY_\Theta$, $YX_\Theta$, and $YY_\Theta$ components;

comparing a travel time of $XX_\Theta$ and $YY_\Theta$ components to identify a fast wave and a slow wave from the rotated waveform components;

applying a smoothing function, wherein the smoothing function comprises:

$$\theta' = \mod\left(\theta + \frac{\pi}{2}, \pi\right) \quad \text{if } |\hat{\theta} - \theta| > \theta_{th}$$
$$\theta' = \theta \quad \text{else}$$

where $\hat{\theta}$ represents a mean value of an estimate of fast shear azimuth and $\theta_{th}$ represents a threshold of determination;

processing the fast wave and the slow wave using high-resolution data-driven processing to obtain a fast wave flexural dispersion curve and a slow wave flexural dispersion curve;

determining a frequency dependent anisotropy curve using the fast wave flexural dispersion curve and the slow wave flexural dispersion curve; and determining shear anisotropy.

22. A method comprising:

disposing an acoustic logging tool in a wellbore, wherein the acoustic logging tool comprises a transmitter and a receiver;

emitting a flexural wave from the transmitter;

recording a four component dipole waveform with the receiver, wherein the four component dipole waveform comprises XX, XY, YX, and YY components;

rotating the four component dipole waveform using Alford rotation to produce rotated waveform components, wherein the rotated waveform components comprise $XX_\Theta$, $XY_\Theta$, $YX_\Theta$, and $YY_\Theta$ components;

comparing a travel time of $XX_\Theta$ and $YY_\Theta$ components to identify a fast wave and a slow wave from the rotated waveform components;

processing the fast wave and the slow wave using high-resolution data-driven processing to obtain a fast wave flexural dispersion curve and a slow wave flexural dispersion curve;

determining a frequency dependent anisotropy curve using the fast wave flexural dispersion curve and the slow wave flexural dispersion curve wherein determining a frequency dependent anisotropy curve comprises solving the following equation:

$$Ani(f) = 2\frac{S_{FL}^s(f) - S_{FL}^f(f)}{[S_{FL}^f(f) + S_{FL}^s(f)]Sens(f)}$$

where $S_{FL}^s$ is flexural dispersion estimates for the slow wave, $S_{FL}^f$ is flexural dispersion estimates for the fast wave, sens(f) is flexural sensitivity of shear wave slowness, and Ani(f) is a low-frequency asymptote; and determining a shear anisotropy.

23. A method comprising:

disposing an acoustic logging tool in a wellbore, wherein the acoustic logging tool comprises a transmitter and a receiver;

emitting a flexural wave from the transmitter;

recording a four component dipole waveform with the receiver, wherein the four component dipole waveform comprises XX, XY, YX, and YY components;

rotating the four component dipole waveform using Alford rotation to produce rotated waveform components, wherein the rotated waveform components comprise $XX_\Theta$, $XY_\Theta$, $YX_\Theta$, and $YY_\Theta$ components;

comparing a travel time of $XX_\Theta$ and $YY_\Theta$ components to identify a fast wave and a slow wave from the rotated waveform components;

processing the fast wave and the slow wave using high-resolution data-driven processing to obtain a fast wave flexural dispersion curve and a slow wave flexural dispersion curve;

determining a frequency dependent anisotropy curve using the fast wave flexural dispersion curve and the slow wave flexural dispersion curve; and determining a shear anisotropy wherein determining the shear anisotropy comprises:

preparing an anisotropy model from the frequency dependent anisotropy curve;

fitting the anisotropy model to a difference measurement wherein fitting the anisotropy model comprises determining:

$$\Delta s_{model}(f) = [\Delta s_0 + s_{FL}^{AVG}(af)*b] - s_{FL}^{AVG}(f)$$

where $\Delta s_{model}(f)$ is the difference between the anisotropy model and the difference measurement, $\Delta s_0$ is a variable, a is a variable, b is a variable, and $s_{FL}^{AVG}(f)$ is an average value of the anisotropy model for a fast wave at a specified frequency; and determining an anisotropy specified by a distance resolution between transmitter and receiver.

\* \* \* \* \*